US006956206B2

United States Patent
Bandy et al.

(10) Patent No.: US 6,956,206 B2
(45) Date of Patent: Oct. 18, 2005

(54) NEGATIVE ION ATMOSPHERIC PRESSURE IONIZATION AND SELECTED ION MASS SPECTROMETRY USING A 63NI ELECTRON SOURCE

(75) Inventors: Alan R. Bandy, Blue Bell, PA (US); Robert Gordon Ridgeway, Quakertown, PA (US); Glenn Michael Mitchell, Sellersville, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 10/264,180

(22) Filed: Oct. 3, 2002

(65) Prior Publication Data

US 2004/0108454 A1 Jun. 10, 2004

Related U.S. Application Data

(60) Provisional application No. 60/326,679, filed on Oct. 3, 2001.

(51) Int. Cl.[7] .......................... B01D 59/44; H01J 49/00
(52) U.S. Cl. ..................... 250/288; 250/281; 250/282
(58) Field of Search .............................. 250/281, 282, 250/288

(56) References Cited

U.S. PATENT DOCUMENTS

| 4,023,398 | A | | 5/1977 | French et al. ................... 73/23 |
| 4,261,698 | A | * | 4/1981 | Carr et al. ................... 436/138 |
| 5,304,797 | A | | 4/1994 | Irie et al. ..................... 250/287 |
| 5,869,344 | A | * | 2/1999 | Linforth et al. .............. 436/173 |
| 6,596,991 | B1 | * | 7/2003 | Yoshida et al. .............. 250/296 |
| 6,744,041 | B2 | * | 6/2004 | Sheehan et al. ............. 250/283 |

* cited by examiner

Primary Examiner—John R. Lee
Assistant Examiner—Paul M. Gurzo
(74) Attorney, Agent, or Firm—Licata & Tyrrell P.C.

(57) ABSTRACT

Negative ion atmospheric pressure ionization mass spectrometers and selected ion mass spectrometers with a $^{63}$Ni ion source and a drift tube for reaction of a sample with electrons from the $^{63}$Ni ion source prior to analysis of a sample by mass spectrometry are provided. Also provided are methods for chemically analyzing a sample by negative ion atmospheric pressure ionization mass spectrometry by exposing the sample to electrons from a $^{63}$Ni ion source in a drift tube and allowing the sample and electrons to react in the drift tube prior to analysis via mass spectrometry.

4 Claims, 4 Drawing Sheets

NEGATIVE ION ATMOSPHERIC PRESSURE IONIZATION AND SELECTED ION MASS SPECTROMETRY USING A 63NI ELECTRON SOURCE

This application claims the benefit of priority of U.S. provisional patent application Ser. No. 60/326,679 filed Oct. 3, 2001.

INTRODUCTION

FIELD OF THE INVENTION

The present invention relates to apparatuses and methods which use negative ions in Atmospheric Pressure Ionization Mass Spectrometry (APIMS) and Selected Ion Mass Spectrometry (SIMS). In the apparatuses and methods of the present invention, electrons are produced by an ionizing source comprising $^{63}$Ni. As demonstrated herein, using the negative ion APIMS method of the present invention results can be obtained where positive ion APIMS fails. For example, negative ion APIMS can be used to determine $H_2O$ content in $NH_3$, an analysis that is not easily performed in positive ion mode. In addition, negative ion APIMS can be used in conjunction with isotope dilution to improve the accuracy of determinations made by negative ion APIMS and to make peaks that are not sensitive to analyte concentration (saturated) useful for chemical analyses.

BACKGROUND OF THE INVENTION

Atmospheric pressure ionization mass spectrometers analyze trace impurities (on the level between parts per billion (ppb) and parts per trillion (ppt)) in gases. These instruments are used routinely to analyze gas samples for water and in manufacturing of semiconductor devices where analysis of trace impurities and supply of highly purified gases in the production process is crucial to device performance.

Atmospheric Pressure Ionization Mass Spectrometry (APIMS) differs from conventional mass spectrometry in that the ions are generated near atmospheric pressure. In electron impact ionization the source pressure is maintained below about 2 torr. At these pressures the ions observed are those generated by only one collision because the collision rate is so low that chemical reactions between ions are slow. In contrast the collision rate near atmospheric pressure is very high so primary ions rarely survive. The ions observed are the result of chemical reactions of ions and neutrals. When the ions enter the mass spectrometer they may or may not be near equilibrium so the concentrations of ions can be influenced by both the kinetic and equilibrium properties of the system.

A conventional atmospheric pressure ionization mass spectrometer is described in U.S. Pat. No. 4,023,398. In this apparatus, sample gas at almost 1 atmosphere is ionized in an ion source by discharge or radiation. Formed sample gas ions cause an ion-molecule reaction and trace components contained in the sample gas are ionized highly efficiently. Formed trace component ions are transmitted by the electric field through a gas curtain chamber and an aperture to an analysis region wherein they are separated by mass and detected. To prevent sample gas from entering the analysis region, the curtain gas is controlled so as to flow into the ion source from the gas curtain chamber.

U.S. Pat. No. 5,304,797 describes a spectrometer having an ion source chamber and a drift chamber for drifting and separating the main component ions of a gas sample from impurity ions. Ionization means for this spectrometer may comprise a corona discharge, a radiation source, a laser or any other known and suitable ionization means.

Positive ion APIMS using corona discharge ion sources are widely used for determining trace contamination in industrial gases. It is the standard for determining moisture and is the method to which all other techniques are compared. A simplified drawing of a corona discharge source is shown in FIG. 1. The needle is maintained at about 5000 volts and is located about −2 mm from an insulated metal orifice whose potential is controlled near ground potential. In positive ion mode, electrons stream from the orifice to the needle producing a neutral ion plasma. Under relatively dry conditions, low analyte concentrations and when other species of higher proton affinity are at low concentration, positive ion APIMs can be used to determine many species of interest including, but not limited to $CH_4$, $CO_2$, and $O_2$.

However, when other species of higher proton affinity are present in relatively high concentrations, for example in the determination of $H_2O$ content in $NH_3$ gas, positive ion APIMS is difficult to employ. Specifically, since the proton affinity of $NH_3$ is so much higher than $H_2O$, ions produced from $H_2O$ normally cannot be observed. Further, peaks for the adducts of $H_2O$ are weak because the $NH_3$ concentration is so high that $NH_4^+$ and its complexes dominate the spectrum.

In negative ion mode the needle of the corona discharge is positive so electrons stream from the needle to the orifice. However, with most sources of electrons, a large fraction of the electrons enter the mass spectrometer. The electrons pass through the quadrupole filter without being deflected producing a large background signal at each mass. This occurs, although to a lesser degree, even when substances of finite electron affinity are present. The large background signal created by these electrons entering the mass spectrometer increase the lower limit of detection and decreases sensitivity.

SUMMARY OF THE INVENTION

An object of the present invention is to provide a negative ion atmospheric pressure ionization mass spectrometer or a selected ion mass spectrometer comprising a nickel-63 ion source and a drift tube connecting the nickel-63 source to a mass spectrometer.

Another object of the present invention is to provide a more sensitive method for chemically analyzing a sample by negative ion atmospheric pressure ionization mass spectrometry with a lower limit of detection. In this method, a sample is exposed to electrons from a nickel-63 ion source at the beginning of a drift tube. The drift tube allows the reaction between the electrons and the sample to proceed for a longer time as compared to methods using corona discharge as the sample and electrons drift from a first end of the tube to a second end of the tube where a mass spectrometer is connected. Further, no measurable amounts of electrons enter the mass spectrometer from the drift tube, thus rendering the background negligible.

DETAILED DESCRIPTION OF THE INVENTION

The present invention relates to the identification of a new source for production of negative ions for chemical analyses of samples, preferably gas samples, via mass spectrometry. It has now been found that nickel-63 ($^{63}Ni$) can be used as a source to produce negative ions for chemical analysis of samples by atmospheric pressure ion mass spectrometry (APIMS) and selected ion mass spectrometry. In the present invention, a sample is exposed to electrons from a $^{63}Ni$ ion source at the beginning of a drift tube. The drift tube allows the reaction between the electrons and the sample to proceed for a longer time as compared to methods using corona discharge. Further, no measurable amounts of electrons enter the mass spectrometer from the drift tube, thus rendering the background negligible.

Figure 1:
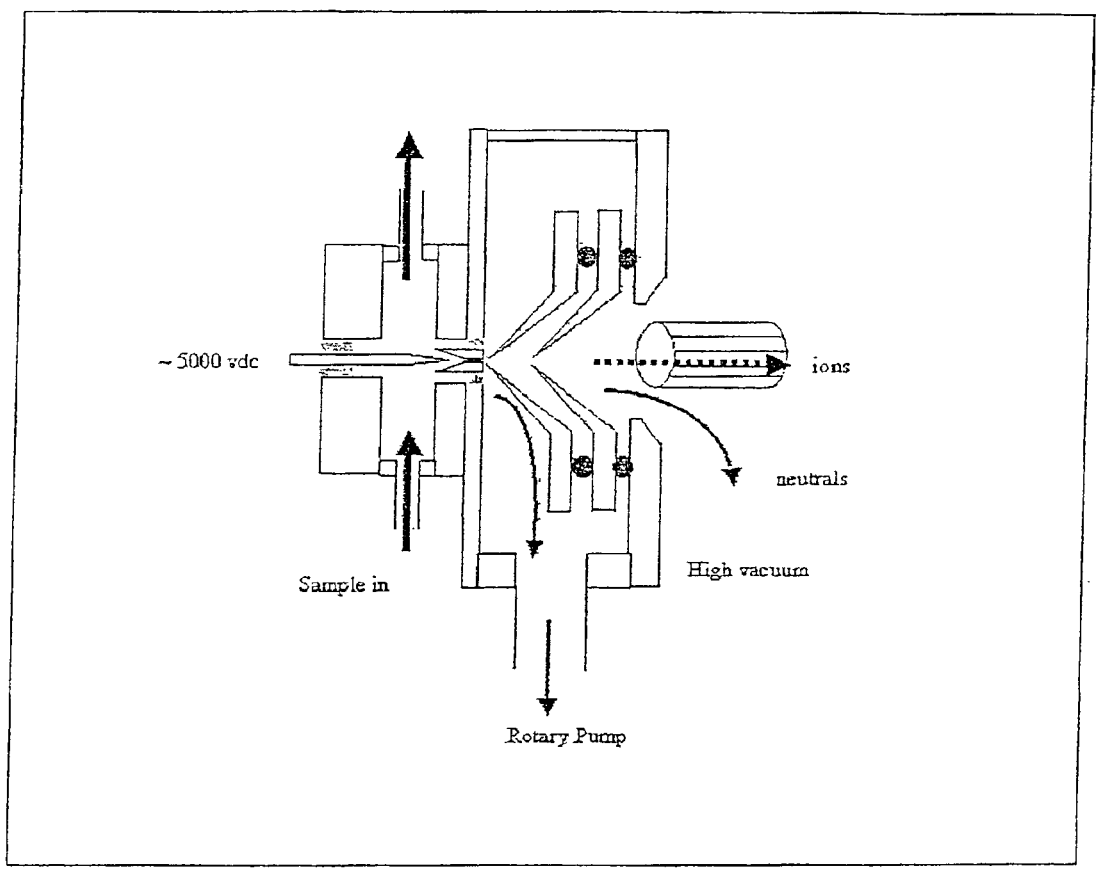
FIG. 1 provides a schematic diagram of a typical corona discharge ion source for positive ion APIMS.
Figure 2:
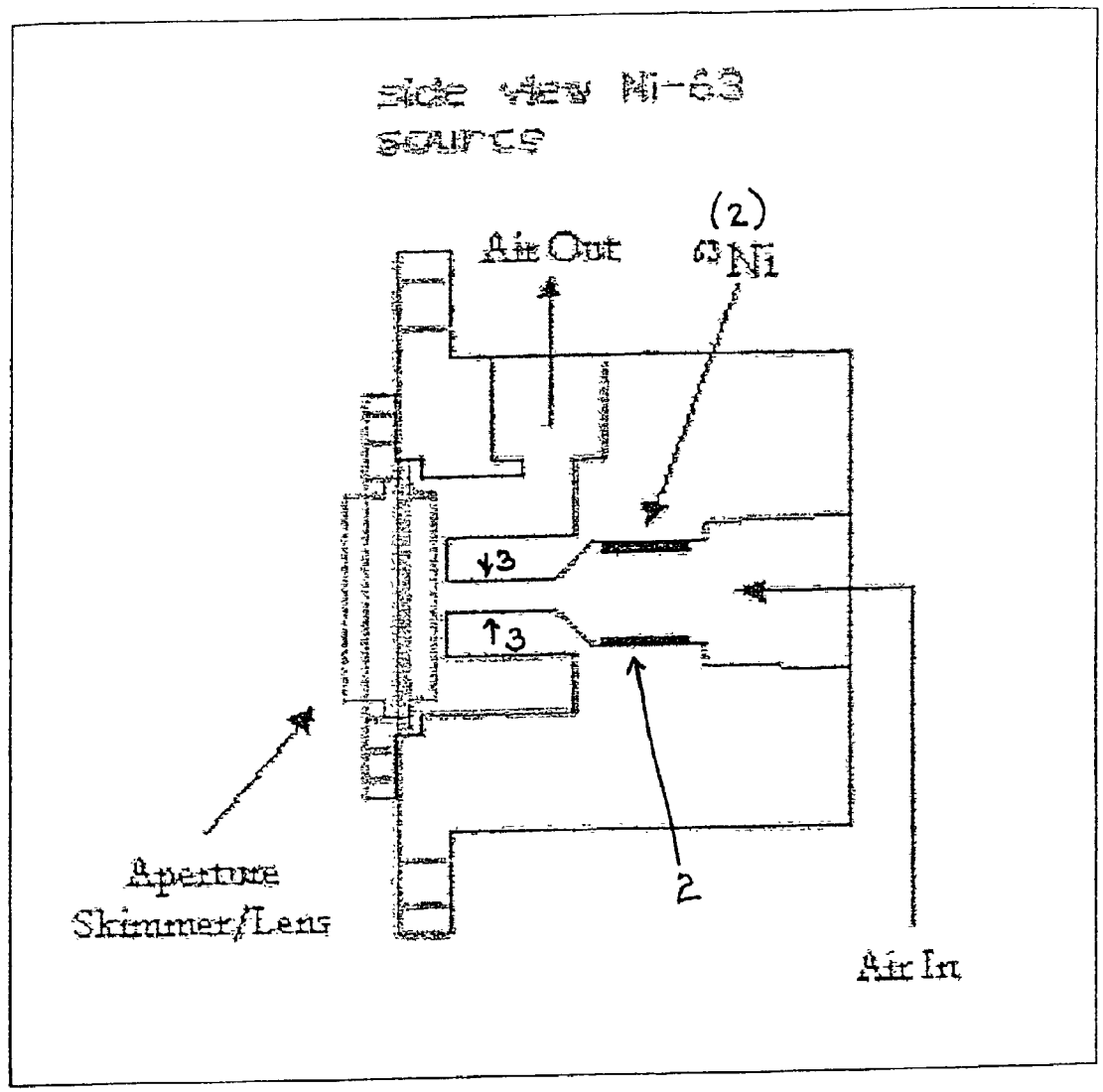
FIG. 2 provide a schematic diagram of a $^{63}$Ni ion source and drift tube for the negative ion APIMS of the present invention.

Accordingly, one aspect of the present invention relates to a negative ion atmospheric pressure ionization mass spectrometer or a selected ion mass spectrometer comprising as its ionizing means a $^{63}Ni$ ion source. The spectrometer further comprises a drift tube with a first and second end which connect the ion source at the first end of the drift tube to the mass spectrometer at the second end for the drift tube. A schematic diagram of a $^{63}Ni$ ion source 2 and drift tube 3 of the present invention is depicted in FIG. 2. In this mass spectrometer, the sample is exposed to electrons from a $^{63}Ni$ ion source at the first end of the drift tube. In a preferred embodiment, the $^{63}Ni$ is deposited on the inside of a stainless steel ring at a first end of the drift tube. Drift tubes ranging in diameter from approximately 5–15 mm and in length from approximately 25–100 mm can be used. A drift tube approximately 8 mm in diameter and approximately 50 mm in length is preferred. The size of the drift tube permits the reaction between the electrons and the sample to proceed for a longer time as compared to instruments wherein a corona discharge is used as the sample and electrons drift from the first end of the drift tube to the second end wherein the mass spectrometer is attached. In addition, the $^{63}Ni$ ion source in combination with the drift tube minimizes the number of electrons entering the mass spectrometer attached at the second end of the drift tube. Accordingly, high background signal created by electrons entering the mass spectrometer as observed in negative ion atmospheric pressure ionization mass spectrometers with other sources of negative ions is not a problem in the spectrometer of the present invention.

Another aspect of the present invention relates to a more sensitive method with a lower limit of detection for chemically analyzing a sample by negative ion atmospheric pressure ionization mass spectrometry. In this method, a sample is exposed to electrons from a $^{63}Ni$ ion source at a first end of a drift tube. The sample and electrons are then allowed to react as they drift through the tube to the opposite end, also referred to herein as the second end of the drift tube, wherein a mass spectrometer is located. Accordingly, the drift tube allows the reaction between the electrons and the sample to proceed for a longer time as compared to methods using corona discharge. Further, no measurable amounts of electrons enter the mass spectrometer from the drift tube, thus rendering the background negligible.

In the spectrometer and methods of the present invention, when oxygen is added to He, the $O_2$ reacts with the electrons present:

$$O_2 + e \rightarrow O_2^-$$

Ions useful for analytical purposes are produced by charge transfer reactions such as $$O_2^- + SO_2 \rightarrow O_2 + SO_2^-$$

or by adduct formation $$O_2^- + H_2O + M \rightarrow O2^-.H_2O + M^-$$

The flexibility of either approach depicted in the above equations is high. Here, the choice of He as the bulk gas, $O_2$ as the electronegative substance and $H_2O$ as the substance analyzed are examples of the analytical methods developed on the more general reactions.

$$X + e \rightarrow X^{-1}$$

$$X^{-1} + Y \rightarrow X^{-1}Y$$

$$X^{-1} + Y \rightarrow Z^{-1} + W$$

The substance Y can thus be determined by monitoring the mass of $X^{-1}Y$ or $Z^{-1}$.

This general approach can be used also for qualitative identification of impurities. If a species Y is present and it forms the species Z or a complex with $X^{-1}$ ($X^{-1}$ Y), its presence can be detected by observing a peak in the mass spectrum at the mass of $X^{-1}$ Y or Z. For example, if methanol is present and $O_2$ is the electronegative additive, then the presence of methanol is indicated by the presence of a peak at 64 amu that is due to the adduct $CH_3COH$ $O_2^-$. That this peak is due to the adduct $CH_3COH$ $O_2^-$ can be proven by verifying that the ion at 64 amu decomposes into $CH_3COH$ and $O_2^-$ when the declustering voltages and pressure are suitably changed. $SO_2$ can be identified as present by a peak in the mass spectrum at 64 amu due to $SO_2$. Its presence can be verified, as done for methanol, because $SO_2^-$ does not decompose into methanol and $O_2^-$ with normal changes in decluster pressure and decluster voltage.

Figure 3:
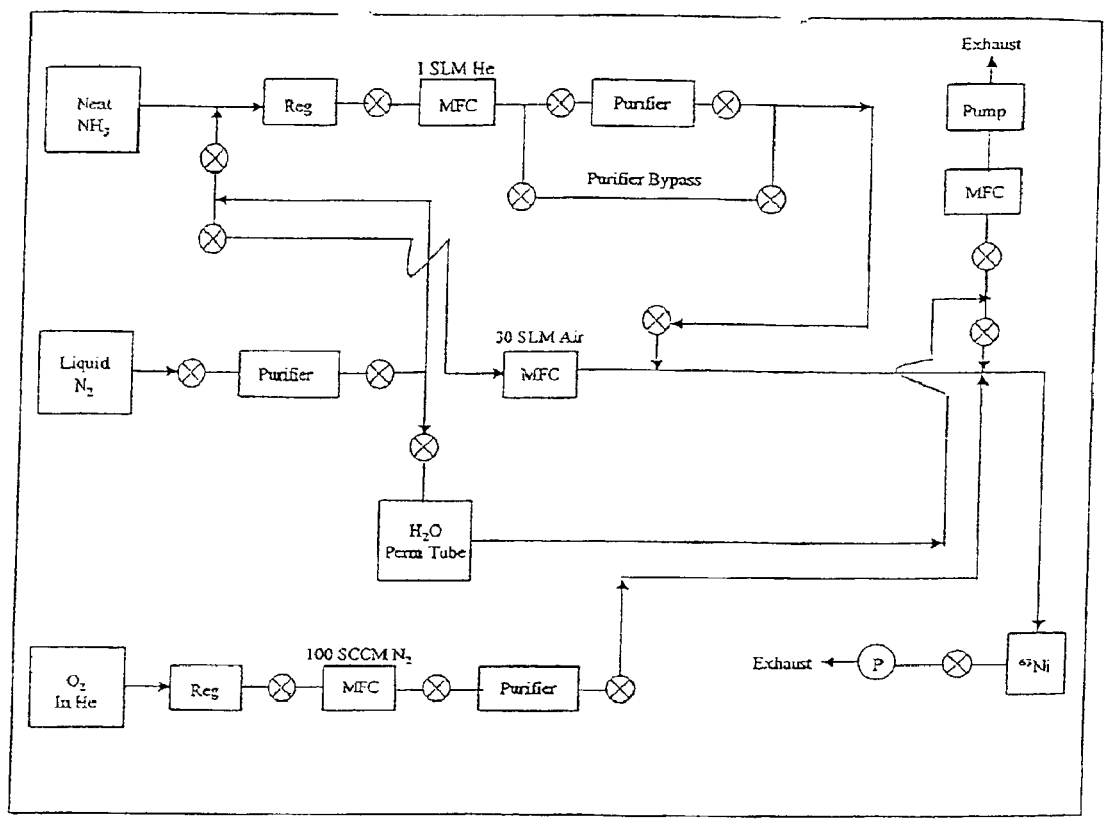
FIG. 3 shows a manifold used for determination of $H_2O$ in $NH_3$ via the negative ion APIMS of the present invention.

Negative ion APIMS of the present invention is particularly useful in determining $H_2O$ in $NH_3$. $H_2O$ in $NH_3$ can be detected at concentrations as low as 10 parts per billion volume (ppbv). $CO_2$ in $NH_3$ can be determined via a similar method at levels as low as 1 ppbv. A manifold system used to determine $H_2O$ in $NH_3$ via the spectrometer and method of the present invention is depicted in FIG. 3. A flow rate of 2 L $min^{-1}$ of $N_2$ dried to less than 1 ppbv $H_2O$ is preferably maintained in the main manifold. $NH_3$ is added to this manifold at a flow rate of preferably 0.200 L $min^{-1}$ producing a dilution factor of 10. However, as will be understood by one of skill in the art upon reading this disclosure, the flow rate of $N_2$ can be varied from about 2 to about 50 L $min^{-1}$. Similarly, the ammonia flow rate can be varied over a wide range such as about 0.05 to about 5 L $min^{-1}$. The dilution factor of 10 was selected to optimize the signal for $H_2O$ because as dilution decreases the $NH_3$ level increases, thus allowing $NH_3$ to compete for $O_2^-$ and lowering the sensitivity for $H_2O$. $H_2O$ is determined by monitoring $O_2^-.H_2O$ (peak in spectra at 50 amu) at moisture levels below 1 ppmv. The sensitivity of this method is decreased by the competition of $NH_3$ for $O_2^-$:

$$O_2^-.H_2O + NH_3 \rightarrow O_2^-.NH_3 + H_2O$$

$O_2^-.NH_3$ can be observed as a peak at 49 amu. Increasing the amount of $NH_3$ increases sensitivity by decreasing dilution and decreases sensitivity by destroying $O_2^-.H_2O$. Accordingly, an $NH_3$ level is selected which optimizes the sensitivity. For example, using the above described system, an $NH_3$ level of about 5% is preferred. However, as will be understood by those skilled in the art upon reading the disclosure, the level will vary with the manifold parameters. Higher hydrates and complexes with $NH_3$ will form at higher concentrations of $H_2O$ and $NH_3$ However, these more complex species are not present in significant amounts at the concentrations of $H_2O$ and $NH_3$ where determinations usually are carried out.

A calibration curve for $H_2O$ measured via the present invention following addition of known amounts of $H_2O$ to the manifold using permeation tube standards was generated. $H_2O$ determination using the present invention was both linear and reproducible.

The amount of $H_2O$ is determined by measuring the difference in peak intensity of the 50 amu peak when $NH_3$ is passed through a highly efficient purifier and when $NH_3$ is bypassed around the purifier. A single point calibration from $H_2O$ can be used once linearity has been established. In this analysis, it is preferred that at least 1000 points be taken for each of these two states. The moisture calibration spike is then added to the manifold and a sensitivity is established.

Using the method and spectrometer of the present invention, an analysis was performed wherein there was a difference of 2000 counts between the purifier mode and the bypass mode. The sensitivity for $H_2O$ addition was 156 counts ppbv$^{-1}$. Thus, it was determined that 16 ppbv of $H_2O$ were present in the manifold. Taking into account dilution, this concentration must be multiplied by 10 to yield 60 ppbv.

The confidence interval for the difference in the total signal and the background provides an estimate of the lower limit of detection (LLD) for this method:

$$LLD = st\left(\frac{1}{n_b} + \frac{1}{n_s}\right)^{1/2}$$

where t is the t-value of the distribution which is normally selected at the 95% confidence level (t=1.96), s is the standard deviation of the two sets, $n_s$ is the number of sample points, and $n_b$ is the number of background points. In the above analysis, s=120, $n_d$=1000, and $n_b$=1000. The lower limit of detection at the 95% confidence level (t=1.96) is computed to be 0.54 ppbv. Multiplying by the dilution factor of 10 yields a lower limit of detection of 5.4 ppbv for $H_2O$ in the $NH_3$.

In another embodiment, the present invention is used in isotope dilution APIMS. The sensitivity of APIMS for species including, but not limited to, $CH_4$, $O_2$, CO, and $CO_2$ depends on the concentration of $H_2O$ and other species. In experiments with a purifier designed to remove these compounds, sensitivity was also found to depend on $CH_4$. The purifier used in these studies did not remove $CH_4$ as expected, thus resulting in high levels of $CH_4$ entering the APIMS. These high levels of $CH_4$ used up most of the available positive ions thus reducing the sensitivity for the other species.

It has now been found, however, that this calibration problem can be bypassed by using isotopomers of the analytes as internal standards. Application of this method is exemplified below for determination of $SO_2$. However, as will be understood by one of skill in the art upon reading this disclosure, the method is applicable to difficult analyses in the industrial gas field in general.

Figure 4:
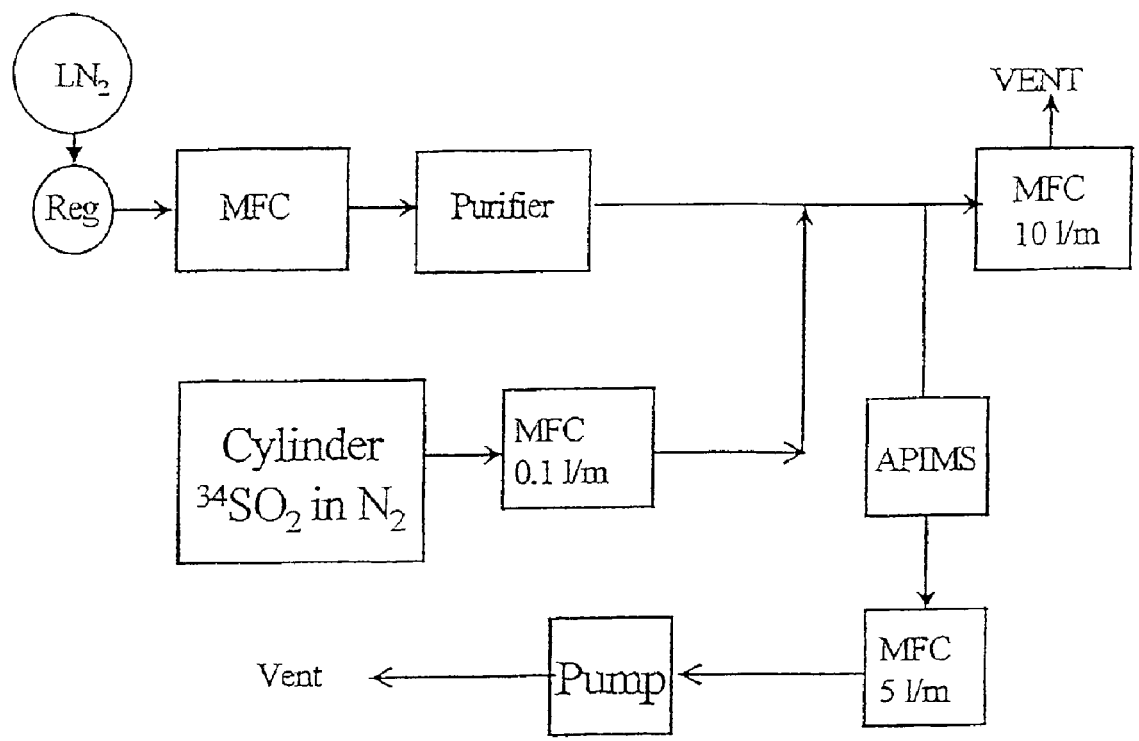
FIG. 4 shows a manifold used for isotope dilution in the determination of $SO_2$ via the negative ion APIMS of the present invention.

A manifold for isotope dilution APIMS is shown in FIG. 4. $^{34}S^{16}O_2$ is added to the manifold as an internal standard. Most natural $SO_2$ is $^{32}S^{16}O_2$. In this analysis $SO_5^-$ is monitored.

The chemical and most physical properties of these two isotopomers are the same. Their signals are given by the expressions:

$$S(^{34}S^{16}O_5^-) = \alpha[^{34}S^{16}O_2]$$

$$S(^{32}S^{16}O_5^-) = \alpha[^{32}S^{16}O_2]$$

wherein S $(^{34}S^{16}O_5^-)$ and $S(^{32}S^{16}O_5^-)$ are the signals, $[^{34}S^{16}O_2]$ and $[^{32}S^{16}O_2]$ are the concentrations of $^{34}S^{16}O_2$ and $^{32}S^{16}O_2$, respectively, and $\alpha$ is the instrument sensitivity. Taking the ratio of these two equations and making some simple rearrangements produces the following equation:

$$[^{32}S^{16}O_2] = \frac{S(^{32}S^{16}O_5^-)}{S(^{32}S^{16}O_5^-)}[^{32}S^{16}O_2].$$

The concentration of $[^{32}S^{16}O_2]$ can be computed without knowing the sensitivity of the instrument for the analyte. Because the concentration and signal of the isotopomers are obtained for every sample, the sensitivity and lower limit of detection (LLD) can be precisely computed for each sample. Isotope dilution can be routinely extended to various species including, but not limited to $H_2O$, $CO_2$, CO, and CH4, in accordance with the teachings provided herein.

In yet another embodiment, the present invention is utilized with peaks that are saturated to provide an analytically useful mass spectra of a chemical species which consumes all available charge. Typically, in APIMS, if the analyte has a very high proton affinity in positive ion mode or high enough electron affinity in negative ion mode, it depletes the available charge. Therefore, the signal for these analytes and its corresponding peak in the mass spectrum are not dependent on analyte concentration. Thus, the peak is generally considered useless for analytical chemistry.

In the present invention, this problem is overcome through use of saturated peaks. Accordingly, the present invention also provides a very sensitive analytical method for analytes with high electron affinity in negative ion mode.

Carbon dioxide, a relatively inert matrix gas, is used to exemplify this application for the method of the present invention. Either $O_2$ or $O_3$ can be added to convert $CO_2$ to $CO_2^-$ and $CO_3^-$, respectively. When $O_3$ is added, peaks due to $CO_3^-$ are saturated because the electron affinity of $CO_3$ is very high. To use this peak that is in saturation, $^{13}C^{16}O_2$ is added as an internal standard. Natural $CO_2$ is primarily $^{12}C^{16}O_2$. Since these isotopomers have the same chemistry, two peaks are observed, one for $^{12}C^{16}O_2$ at 60 amu and one for $^{13}C^{16}O_2$ at 61 amu. The ratio of the intensities of the two peaks is the ratio of the concentration of these two isotopomers. Since the concentration of $^{13}C^{16}O_2$ is known the concentration of $^{12}C^{16}O_2$ is obtained even though the peak is saturated:

$$[^{12}C^{16}O_2] = \frac{S(^{12}C^{16}O_3^-)}{S(^{13}C^{16}O_3^-)}[^{13}C^{16}O_2]$$

This method is similar to that used for $SO_2$ except the peaks for $SO_2$ are not in saturation.

What is claimed is:

1. A negative ion atmospheric pressure ionization mass spectrometer or a selected ion mass spectrometer comprising:
   (a) a nickel-63 ion source;
   (b) a drift tube 5 to 15 mm in diameter and 25 to 100 mm in length having a first end and a second end, said drift tube being connected to the nickel-63 ion source at said first end; and
   (c) a mass spectrometer connected to said second end of said drift tube.

2. A method for chemically analyzing a sample by negative ion atmospheric pressure ionization mass spectrometry comprising:
   (a) exposing a sample to electrons from a nickel-63 ion source at a first end of a drift tube 5 to 15 mm in diameter and 25 to 100 m in length;
   (b) allowing the sample and electrons to react as the sample and electrons drift to the second end of the drift tube; and
   (c) analyzing the reacted sample and electrons via a mass spectrometer connected to the second end of the drift tube.

3. The method of claim 2 wherein the sample is chemically analyzed for water content.

4. The method of claim 2 wherein the sample comprises an analyte having an isotopomer and wherein the isotopomer is added as an internal standard to the sample prior to step (a) so that a ratio of intensities of the analyte and isotopomer can be measured and analyte concentration in the sample quantified from the ratio.

* * * * *

UNITED STATES PATENT AND TRADEMARK OFFICE
CERTIFICATE OF CORRECTION

PATENT NO. : 6,956,206 B2  
APPLICATION NO. : 10/264180  
DATED : October 18, 2005  
INVENTOR(S) : Bandy et al.

It is certified that error appears in the above-identified patent and that said Letters Patent is hereby corrected as shown below:

In column 7, line, 16 please delete "25 to 100 m" and insert --25 to 100 mm--.

Signed and Sealed this

Twenty-fifth Day of December, 2007

JON W. DUDAS  
*Director of the United States Patent and Trademark Office*